(12) United States Patent
Cucchi

(10) Patent No.: US 6,227,084 B1
(45) Date of Patent: May 8, 2001

(54) DEVICE FOR GUIDING A BAR FED IN A LATHE SPINDLE

(75) Inventor: Pietro Cucchi, Bussero (IT)

(73) Assignee: Pietro Cucchi S.p.A. (IT)

( * ) Notice: Subject to any disclaimer, the term of this patent is extended or adjusted under 35 U.S.C. 154(b) by 0 days.

(21) Appl. No.: 09/423,012

(22) PCT Filed: Mar. 5, 1999

(86) PCT No.: PCT/EP99/01556

§ 371 Date: Oct. 28, 1999

§ 102(e) Date: Oct. 28, 1999

(87) PCT Pub. No.: WO99/44775

PCT Pub. Date: Sep. 10, 1999

(30) Foreign Application Priority Data

Mar. 6, 1998 (IT) ............................................. MI980143 U

(51) Int. Cl.[7] .................................................. B23B 13/10
(52) U.S. Cl. ................................... 82/126; 82/127; 82/162
(58) Field of Search .............................. 82/126, 125, 127, 82/163, 164, 161; 414/14, 17, 18

(56) References Cited

U.S. PATENT DOCUMENTS

| 3,464,203 | * | 9/1969 | Twersky | 60/328 |
| 5,320,010 | * | 6/1994 | Geiser | 82/127 |
| 5,910,200 | * | 6/1999 | Cucchi | 82/126 |
| 6,095,022 | * | 8/2000 | Lasi et al. | 82/127 |

* cited by examiner

Primary Examiner—Henry Tsai
(74) Attorney, Agent, or Firm—Shlesinger, Fitzsimmons & Shlesinger

(57) ABSTRACT

The devices guides a bar that is advanced by the retractable collet of a bar feeder magazine to the mandrel of a lathe by employing an insert which is slidable with slight clearance within a duct that is connected to the mandrel. The insert has therethrough an axial passage registering at one end with an inlet end of the duct, which is disposed to receive the bar and collet, and the opposite end of the passage designed to be traversed by the bar with slight clearance. The insert is disposed to be engaged and impelled by the advancing collet along the duct a predetermined distance towards the mandrel, after which means is provided to engage and effect return of the insert to a starting position close to the inlet end of the duct upon re-extraction of the collet from the duct.

7 Claims, 3 Drawing Sheets

DEVICE FOR GUIDING A BAR FED IN A LATHE SPINDLE

BACKGROUND OF THE INVENTION

The present invention relates to a device for guiding a bar between a magazine collet and a mandrel of a lathe. In the prior art there are known problems due to insufficient support of the bars rotating at high speed while being fed to automatic lathes. Generation of vibrations is detrimental both for the precision of the work and for the supporting structures.

The conditions are especially critical when the bar is at the start or end of the processing. The problem of managing to satisfy the supporting needs is complicated by the fact that the collet of the bar pusher supporting the bar has to run along the same path as the bar. Since the collet very often has a diameter much larger than the diameter of the bar, to enable the collet to pass it is necessary to leave the bar support slack. This is particularly true inside the mandrel drawrod that is to say inside the duct which conveys the bar towards the mandrel and guides it as far as the collet of the lathe. The general purpose of the present invention is to obviate the aforementioned problems by providing a device which provides optimal support of the bar and the collet of the bar pusher throughout the entire feeding stroke.

SUMMARY OF THE INVENTION

In view of this purpose it is sought to provide in accordance with the present invention a device for guiding a bar between a magazine collet and a mandrel of a lathe comprising a guiding insert which slides with a minimum of side clearance within a duct constituting the mandrel drawrod with the insert having an axial passage for the bar with at least one section designed to be traversed by the bar with a minimum of side clearance, the insert being impelled along the duct towards the mandrel and return means being provided to return the insert to a starting position close to an inlet end of the duct upon re-extraction of the collet from the duct.

To clarify the explanation of the innovative principles of the present invention and its advantages compared with the prior art there is described below with the aid of the annexed drawings a possible embodiment thereof by way of nonlimiting example applying said principles. In the drawings:

THE DRAWINGS

PREFERRED EMBODIMENTS OF THE INVENTION

Figure 1:
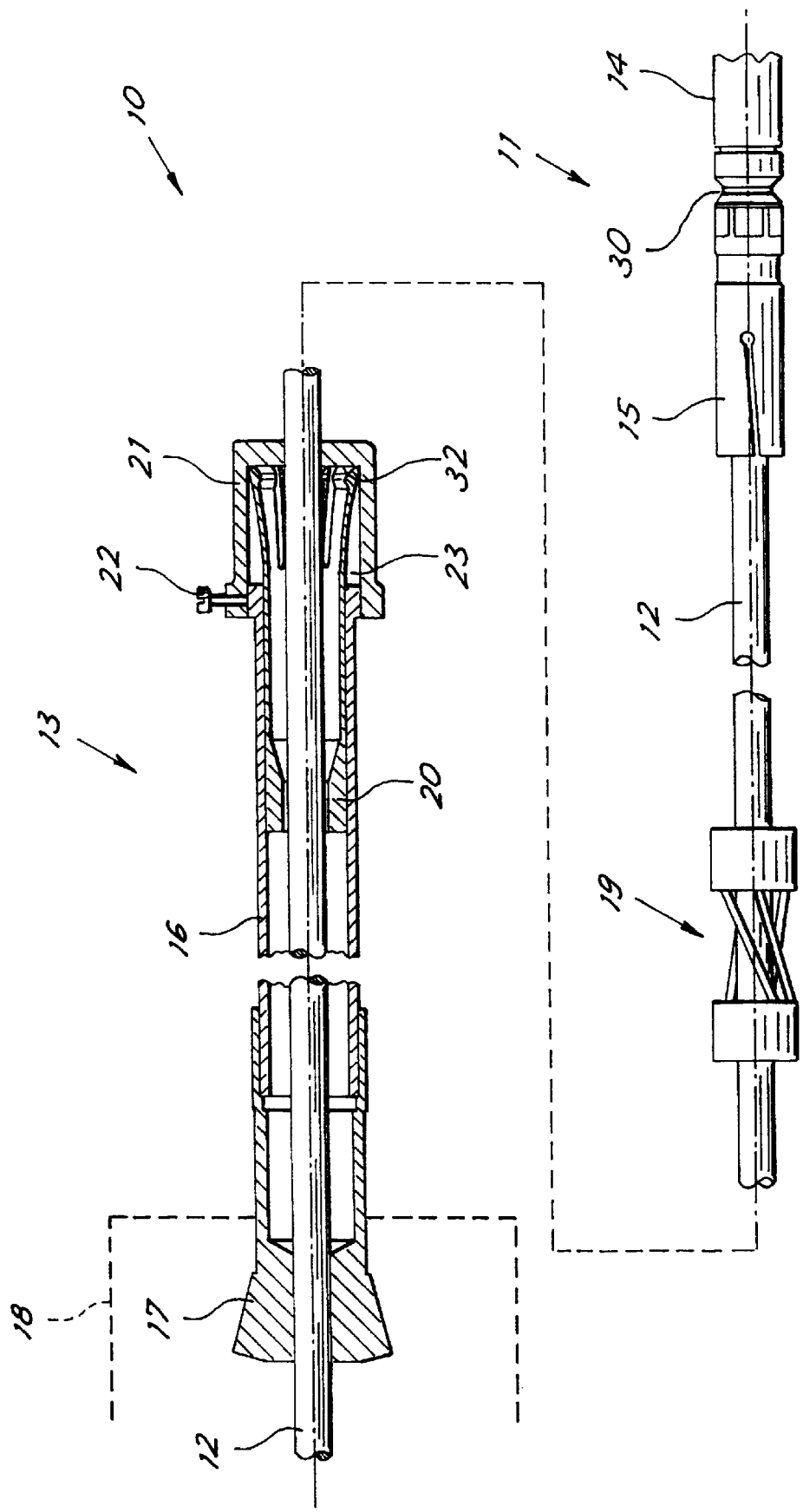
FIG. 1 shows a schematic partial cutaway view of the bar feeder and machining lathe couple forming the subject matter of the present invention.

With reference to the figures, FIG. 1 shows a feeder and lathe couple generically indicated by reference 10 composed of a feeder 11 which transfers a bar 12 to a lathe 13. The magazine comprises a bar pusher 14 which ends with a collet 15 which supports the rear end of the bar to feed the bar into a drawrod or duct 16 of the lathe. The drawrod ends with a grasping collet 17 for the mandrel 18.

Along the bar path the magazine comprises supporting and centering means among which for example is shown a cage-type centering device 19 which can open to allow the collet 15 to pass through.

The magazine and lathe are not further described or shown herein since they are substantially known and therefore can be easily imagined by the expert in the field. According to the principles of the invention in the drawrod of the lathe there is a guiding device which comprises a guiding insert 20 sliding along the drawrod 16.

Figure 2:
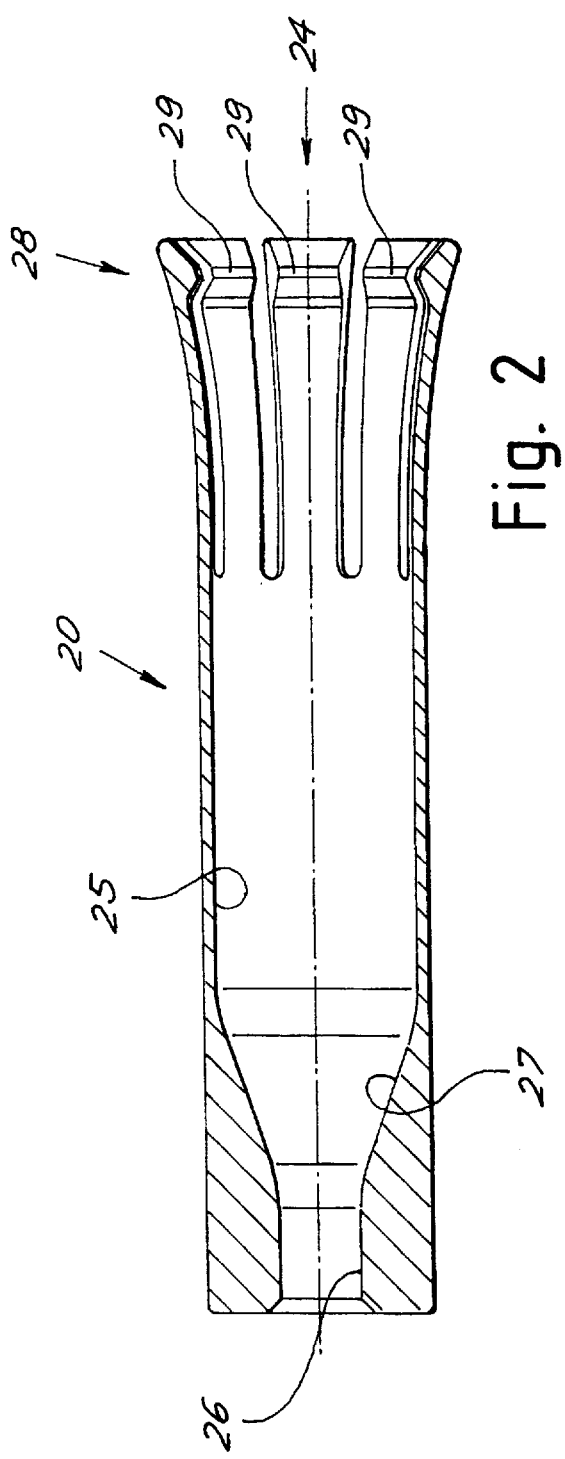
FIG. 2 shows a cross-sectional view of a detail of FIG. 1.

FIG. 2 shows the sliding insert 20 in greater detail. Said insert has a diameter only slightly smaller than the internal diameter of the lathe drawrod so as to be able to slide within it with a minimum side clearance. The insert defines internally an axial passage 24 formed by a first leading section 25 having a diameter large enough to receive the magazine collet with minimum side clearance and by a second section 26 having a diameter large enough to receive the bar 12 with minimum side clearance. The two sections are connected by a tapered section 27.

The insert has an inlet end provided with a crown of elastic fingers 28 each ending with a gripping tooth 29 facing towards the passage 24. The insert can be made from spring steel.

The fingers 28 are slightly divaricated to hold the teeth radially spaced by an amount greater than the diameter of section 25. In other words, under normal conditions the teeth do not protrude into the opening of the passage 24. As can be clearly seen in FIG. 1, the guiding device also comprises a terminal element 21 which is secured (for example by means of a clamp 22) to the inlet end of the drawrod and which defines a chamber 23 larger in width than the internal diameter of the drawrod. The chamber 23 is designed to receive the elastic fingers 28 of the insert to enable them to remain in the divaricated position. A radial projection 32 facing towards the passage of the bar constitutes a limit stop for the reverse movement of the insert.

In use, the guiding device is initially in the position shown in FIG. 1 with the insert arranged at the beginning of the drawrod and with the elastic fingers in the chamber 23. The magazine starts the bar along the guides until it fits into the drawrod, passes through the insert 20 and enters the mandrel. The coupling section 27 helps in inserting the point of the bar.

Under these conditions the bar is supported and centered in at least four points, to wit the magazine collet, the centering device 19, section 26 of the insert and the lathe collet. The long bar is thus perfectly supported in order to avoid undesirable vibrations in the lathe. As the bar gradually becomes shorter the collet 15 advances until it traverses the centering device 19. When the collet has passed the centering device 19, the bar is supported and centered at three points, to wit the magazine collet, section 26 of the insert and the lathe collet. Since the bar has grown shorter it is still perfectly supported at three points.

Figure 4:
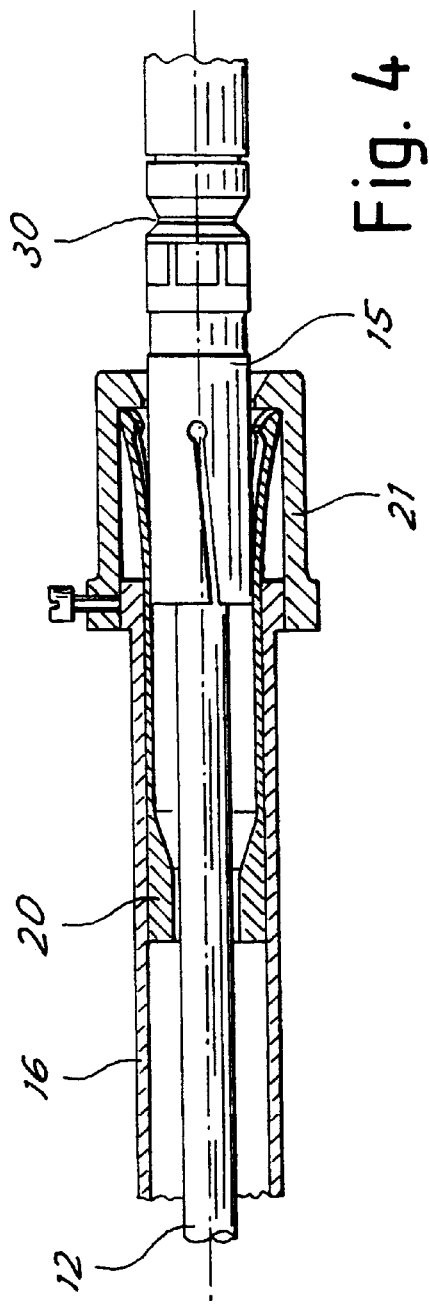
FIG. 4 shows a view similar to that of FIG. 1 of a bar feed intermediate area.

As the bar continues to grow shorter, the magazine collet reaches the drawrod. FIG. 4 shows the entry of the magazine collet into the drawrod.

When the collet reaches the end of section 25 of the insert with an oversize diameter the insert begins to slide forward impelled by the collet. The axial distance between the end of section 25 and teeth 29 is identical to the distance between the head of the collet and a circumferential recess or groove 30 provided on the base of the collet.

Figure 3:
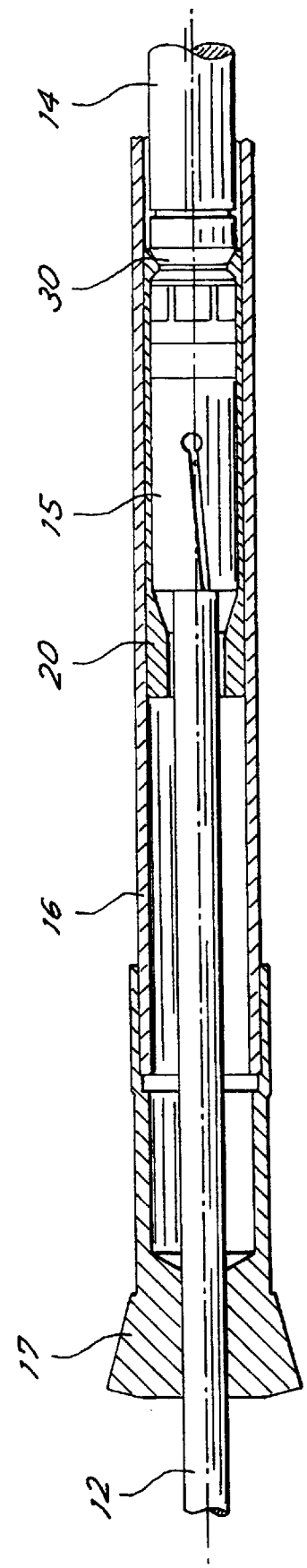
FIG. 3 shows a view similar to that of FIG. 1 of a bar feed end area.

As can be clearly seen in FIG. 3, when the elastic fingers 28 leave chamber 23 and enter the drawrod they are impelled radially towards the inside and the teeth 29 engage in the groove 30.

The collet continues its stroke as far as the stop where the insert 20 reaches the outlet end of the drawrod. As it travels through the drawrod the magazine collet is guided and centered perfectly by the insert 20 in the drawrod with the latter being made internally with a constant diameter if necessary by means of an internal adapter tube.

Upon completion of the work the magazine collet begins the return stroke, pulling the insert back to the initial position shown in FIG. 4. Once the fingers 28 have again reached the chamber 23 they re-expand, disengaging the teeth 29 from the groove 30 and freeing the collet which thus continues its return stroke unhindered. The insert rests with the free ends of the fingers against the limit stop projection 32.

The cycle can be resumed from the beginning with a new bar.

At this point it is clear that the intended purposes have been attained by providing optimal guiding and centering in the various stages of the work.

Naturally the above description of an embodiment applying the innovative principles of the present invention is given by way of non-limiting example of said principles within the scope of the exclusive right claimed here. For example, element 21 can be screwed onto the appropriately threaded end of duct 16.

Figure 5:
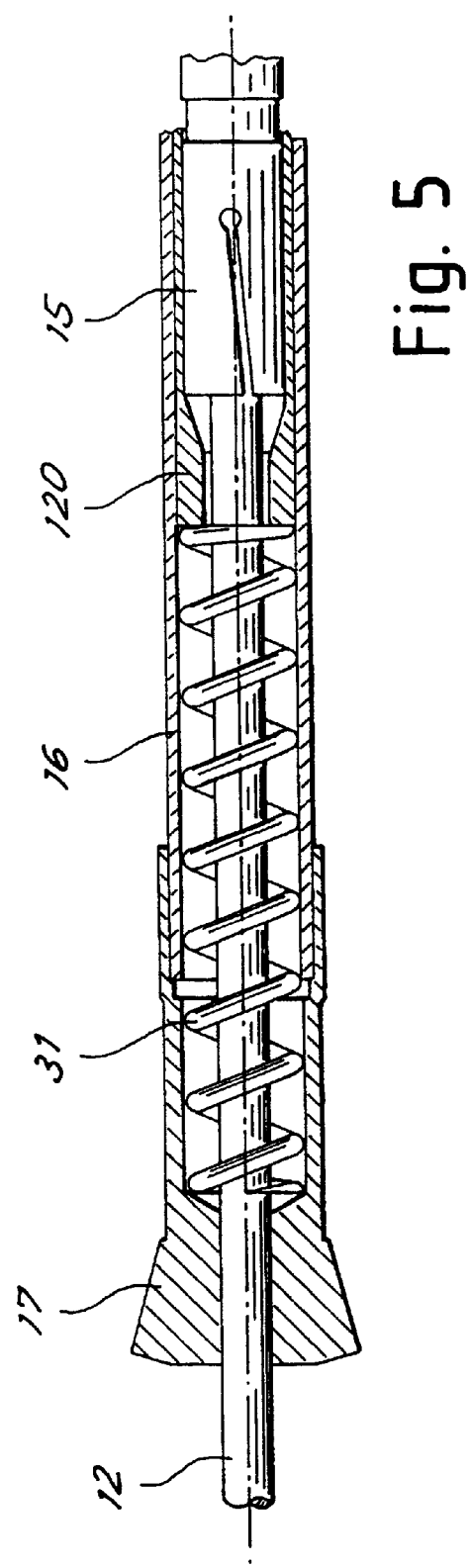
FIG. 5 shows a view similar to that of FIG. 3 of a different embodiment of a device according to the invention.

FIG. 5 shows a variation in which insert 20 is replaced by an insert 120 which slides forward in the drawrod impelled by the collet 15 and returns to its initial position by means of a thrust spring 31. With this solution the gripping fingers and the groove on the collet are not necessary. The insert can also be made of low-friction plastic, for example Teflon®.

Moreover, the insert can be made in two parts, for example screwed or coupled to render the bar guiding part interchangeable so as to adapt it to bars of different diameters.

What is claimed is:

1. Guiding device for guiding a bar being advanced by a retractable collet (15) of a bar feeder magazine (11) to a mandrel (18) of a lathe (13) comprising a guiding insert (20, 120) which is slidable with a small predetermined clearance within a duct (16) connected to the mandrel (18) with the insert (20, 120) having therethrough an axial passage (24) registering with an inlet end of said duct for receiving the bar and collet (15) and with at least one section (26) of said passage designed to be traversed by the bar with a small predetermined clearance, the insert (20, 120) being engaged and impelled by the advancing collet (15) along the duct (16) towards the mandrel, and return means (28, 30, 31) being provided to engage and effect return of the insert (20, 120) to a starting position close to said inlet end of the duct upon re-extraction of the collet from the duct.

2. Device as claimed in claim 1, characterized in that the insert (20, 120) has a further section (25) for axial passage of the bar which faces towards the magazine collet and is designed to receive the collet with a small predetermined side clearance.

3. Device as claimed in claim 2 characterized in that said further section (25) has an inlet aperture for receiving the collet and being provided with elastic fingers (28) bearing teeth (29) facing towards the inside of said axial passage with the elastic fingers (28) tending to remain elastically divaricated to position the teeth (29) outside the inlet aperture of said further section (25) with the fingers coming to rest in a starting position inside a chamber (23) formed adjacent to the inlet end of the duct and having a diameter larger than the diameter of the duct thereby to enable the fingers to remain in their divaricated position, said fingers being thrust inwards against their elastic force and the teeth (29) engaging on the collet when the insert slides within the duct toward the mandrel so as to effect engagement with said return means.

4. Device as claimed in claim 3 characterized in that the chamber (23) is made inside a terminal element (21) secured to the inlet end of the duct.

5. Device as claimed in claim 2 characterized in that provided between said at least one section (26) of the insert and the further section (25) thereof is a tapered connecting section (27).

6. Device as claimed in claim 1 characterized in that the return means comprise a thrust spring (31) which impels the insert (120) along the duct towards the inlet end thereof.

7. Device as claimed in claim 3 characterized in that the collet has a radial coupling groove for engagement by the teeth (29) when they are thrust inwards.

* * * * *